(12) United States Patent
Kaehler

(10) Patent No.: US 9,891,077 B2
(45) Date of Patent: Feb. 13, 2018

(54) DUAL COMPOSITE LIGHT FIELD DEVICE

(71) Applicant: MAGIC LEAP, INC., Plantation, FL (US)

(72) Inventor: Adrian Kaehler, Los Gatos, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 15/159,518

(22) Filed: May 19, 2016

(65) Prior Publication Data

US 2016/0341575 A1    Nov. 24, 2016

Related U.S. Application Data

(60) Provisional application No. 62/163,733, filed on May 19, 2015.

(51) Int. Cl.
*G02B 6/00* (2006.01)
*G01D 5/26* (2006.01)
*G02B 6/10* (2006.01)

(52) U.S. Cl.
CPC .............. *G01D 5/268* (2013.01); *G02B 6/10* (2013.01)

(58) Field of Classification Search
CPC .......... G01N 21/7703; G01N 33/54373; G01L 1/246; G01H 9/004; G02B 6/00
See application file for complete search history.

(56) References Cited

U.S. PATENT DOCUMENTS

| 6,721,053 B1 * | 4/2004 | Maseeh | G01N 21/7746 356/436 |
| 9,423,397 B2 * | 8/2016 | Duer | G02B 6/4226 |
| 2010/0302196 A1 * | 12/2010 | Han | G06F 3/0425 345/173 |
| 2013/0181896 A1 * | 7/2013 | Gruhlke | G06F 3/017 345/156 |
| 2016/0011112 A1 * | 1/2016 | Tappura | B01L 3/5027 506/9 |
| 2017/0052384 A1 * | 2/2017 | Santori | G03H 1/0443 |

\* cited by examiner

*Primary Examiner* — Jennifer Doan
(74) *Attorney, Agent, or Firm* — Morrison & Foerster LLP

(57) ABSTRACT

An apparatus is disclosed for capturing image information. The apparatus includes a waveguide having opposed planar input and output faces. A diffractive optical element (DOE) is formed across the waveguide. The DOE is configured to couple a portion of the light passing through the waveguide into the waveguide. The light coupled into the waveguide is directed via total internal reflection to an exit location on the waveguide. The apparatus further includes a light sensor having an input positioned adjacent the exit location of the waveguide to capture light exiting therefrom and generate output signals corresponding thereto. A processor determines the angle and position of the coupled light with respect to the input face of the waveguide based on the output signals.

4 Claims, 8 Drawing Sheets

DUAL COMPOSITE LIGHT FIELD DEVICE

CROSS-REFERENCE TO RELATED APPLICATIONS

This application claims priority to U.S. Provisional Patent Application No. 62/163,733, filed on May 19, 2015, entitled "DUAL COMPOSITE LIGHT FIELD DEVICE", which is hereby incorporated by reference in its entirety.

FIELD OF THE INVENTION

The subject invention relates to an optical device that is used in an augmented reality system. The augmented reality system is of the type that includes a planar waveguide for transmitting a view of the world while also generating and delivering computer generated images to the user. In the subject invention, one or more additional waveguides are provided to capture images from the world.

BACKGROUND OF THE INVENTION

There is considerable interest in developing systems that create an augmented reality for a user. In one example of such a system, the user would be provided with a head mounted device that includes a window for viewing the outside world. The window would have the capability to generate image information and project that image information into the eyes of the user. In such a system, images of an imaginary object could be generated and added to the real world scene.

A description of a device for creating an augmented reality can be found in U.S. Patent Publication No. 2015/0016777, published Jan. 15, 2015, the disclosure of which is incorporated herein by reference.

As described in the latter publication and illustrated in FIG. 1 herein, the optical system 100 can include a primary waveguide apparatus 102 that includes a planar waveguide 1. The planar waveguide is provided with one or more diffractive optical elements (DOEs) 2 for controlling the total internal reflection of the light within the planar waveguide. The optical system further includes an optical coupler system 104 and a control system 106.

As best illustrated in FIG. 2, the primary planar waveguide 1 has a first end 108a and a second end 108b, the second end 108b opposed to the first end 108a along a length 110 of the primary planar waveguide 1. The primary planar waveguide 1 has a first face 112a and a second face 112b, at least the first and the second faces 112a, 112b (collectively, 112) forming a partially internally reflective optical path (illustrated by arrow 114a and broken line arrow 114b, collectively, 114) along at least a portion of the length 110 of the primary planar waveguide 1. The primary planar waveguide 1 may take a variety of forms which provide for substantially total internal reflection (TIR) for light striking the faces 112 at less than a defined critical angle. The planar waveguides 1 may, for example, take the form of a pane or plane of glass, fused silica, acrylic, or polycarbonate.

The DOE 2 (illustrated in FIGS. 1 and 2 by dash-dot double line) may take a large variety of forms which interrupt the TIR optical path 114, providing a plurality of optical paths (illustrated by arrows 116a and broken line arrows 116b, collectively, 116) between an interior 118 and an exterior 120 of the planar waveguide 1 extending along at least a portion of the length 110 of the planar waveguide 1. The DOE 2 may advantageously combine the phase functions of a linear diffraction grating with that of a circular or radial symmetric zone plate, allowing positioning of apparent objects and a focus plane for apparent objects. The DOE may be formed on the surface of the waveguide or in the interior thereof.

With reference to FIG. 1, the optical coupler subsystem 104 optically couples light to the waveguide apparatus 102. As illustrated in FIG. 1, the optical coupler subsystem may include an optical element 5, for instance a reflective surface, mirror, dichroic mirror or prism to optically couple light into an edge 122 of the primary planar waveguide 1. The light can also be coupled into the waveguide apparatus through either the front or back faces 112. The optical coupler subsystem 104 may additionally or alternatively include a collimation element 6 that collimates light.

The control subsystem 106 includes one or more light sources and drive electronics that generate image data that is encoded in the form of light that is spatially and/or temporally varying. As noted above, a collimation element 6 may collimate the light, and the collimated light is optically coupled into one or more primary planar waveguides 1 (only one primary waveguide is illustrated in FIGS. 1 and 2).

As illustrated in FIG. 2, the light propagates along the primary planar waveguide with at least some reflections or "bounces" resulting from the TIR propagation. It is noted that some implementations may employ one or more reflectors in the internal optical path, for instance thin-films, dielectric coatings, metalized coatings, etc., which may facilitate reflection. Light that propagates along the length 110 of the waveguide 1 intersects with the DOE 2 at various positions along the length 110. The DOE 2 may be incorporated within the primary planar waveguide 1 or abutting or adjacent one or more of the faces 112 of the primary planar waveguide 1. The DOE 2 accomplishes at least two functions. The DOE 2 shifts an angle of the light, causing a portion of the light to escape TIR, and emerge from the interior 118 to the exterior 120 via one or more faces 112 of the primary planar waveguide 1. The DOE 2 can also be configured to direct the out-coupled light rays to control the virtual location of an object at the desired apparent viewing distance. Thus, someone looking through a face 112a of the primary planar waveguide 1 can see digital imagery at one or more viewing distances.

In some implementations, a scanning light display is used to couple light into one or more primary planar waveguides. The scanning light display can comprise a single light source that forms a single beam that is scanned over time to form an image. This scanned beam of light may be intensity-modulated to form pixels of different brightness levels. Alternatively, multiple light sources may be used to generate multiple beams of light, which are scanned either with a shared scanning element or with separate scanning elements to form imagery. These light sources may comprise different wavelengths, visible and/or non-visible, they may comprise different geometric points of origin (X, Y, or Z), they may enter the scanner(s) at different angles of incidence, and may create light that corresponds to different portions of one or more images (flat or volumetric, moving or static).

The light may, for example, be scanned to form an image with a vibrating optical fiber, for example as discussed in U.S. patent application Ser. No. 13/915,530, International Patent Application Serial No. PCT/US2013/045267, and U.S. provisional patent application Ser. No. 61/658,355. The optical fiber may be scanned biaxially by a piezoelectric actuator. Alternatively, the optical fiber may be scanned uniaxially or triaxially. As a further alternative, one or more optical components (e.g., rotating polygonal reflector or mirror, oscillating reflector or mirror) may be employed to scan an output of the optical fiber.

In other embodiments, the image can be generated using a LCOS (liquid crystal on silicon) mirrors formed in an array.

FIG. 3 shows an optical system 300 including a waveguide apparatus, an optical coupler subsystem to optically couple light to or from the waveguide apparatus, and a control subsystem, according to one illustrated embodiment.

Many of the structures of the optical system 300 of FIG. 3 are similar or even identical to those of the optical system 100 of FIG. 1. In the interest of conciseness, in many instances only significant differences are discussed below.

The optical system 300 may employ a distribution waveguide apparatus to relay light along a first axis (vertical or Y-axis in view of FIG. 3), and expand the light's effective exit pupil along the first axis (e.g., Y-axis). The distribution waveguide apparatus may, for example include a distribution planar waveguide 3 and at least one DOE 4 (illustrated by double dash-dot line) associated with the distribution planar waveguide 3. The distribution planar waveguide 3 may be similar or identical in at least some respects to the primary planar waveguide 1, having a different orientation therefrom. Likewise, the DOE 4 may be similar or identical in at least some respects to the DOE 2. For example, the distribution planar waveguide 3 and/or DOE 4 may be comprised of the same materials as the primary planar waveguide 1 and/or DOE 2, respectively.

The relayed and exit pupil expanded light is optically coupled from the distribution waveguide apparatus into one or more primary planar waveguide 1. The primary planar waveguide 1 relays light along a second axis, preferably orthogonal to first axis, (e.g., horizontal or X-axis in view of FIG. 3). Notably, the second axis can be a non-orthogonal axis to the first axis. The primary planar waveguide 1 expands the light's effective exit pupil along that second axis (e.g., X-axis). For example, a distribution planar waveguide 3 can relay and expand light along the vertical or Y-axis, and pass that light to the primary planar waveguide 1 which relays and expands light along the horizontal or X-axis. The remainder of the elements of system 300 shown in FIG. 3 will be discussed below with respect to FIG. 4.

FIG. 4 shows the optical system 300, illustrating generation thereby of a single focus plane that is capable of being positioned closer than optical infinity.

The optical system 300 may include one or more sources of red, green, and blue light 11, which may be optically coupled into a proximal end of a single mode optical fiber 9. A distal end of the optical fiber 9 may be threaded or received through a hollow tube 8 of piezoelectric material. The distal end protrudes from the tube 8 as fixed-free flexible cantilever 7. The piezoelectric tube 8 is associated with four quadrant electrodes (not illustrated). The electrodes may, for example, be plated on the outside, outer surface or outer periphery or diameter of the tube 8. A core electrode (not illustrated) is also located in a core, center, inner periphery or inner diameter of the tube 8.

Drive electronics 12, for example electrically coupled via wires 10, drive opposing pairs of electrodes to bend the piezoelectric tube 8 in two axes independently. The protruding distal tip of the optical fiber 7 has mechanical modes of resonance. The frequencies of resonance depend upon a diameter, length, and material properties of the optical fiber 7. By vibrating the piezoelectric tube 8 near a first mode of mechanical resonance of the fiber cantilever 7, the fiber cantilever 7 is caused to vibrate, and can sweep through large deflections. By stimulating resonant vibration in two axes, the tip of the fiber cantilever 7 is scanned biaxially in an area filling 2D scan. By modulating an intensity of light source(s) 11 in synchrony with the scan of the fiber cantilever 7, light emerging from the fiber cantilever 7 forms an image.

Collimator 6 collimates the light emerging from the scanning fiber cantilever 7. The collimated light may be reflected by mirrored surface 5 into a narrow distribution planar waveguide 3 which contains at least one diffractive optical element (DOE) 4. The collimated light propagates vertically (i.e., relative to view of FIG. 4) along the distribution planar waveguide 3 by total internal reflection, and in doing so repeatedly intersects with the DOE 4. The DOE 4 preferably has a low diffraction efficiency. This causes a fraction (e.g., 10%) of the light to be diffracted toward an edge of the larger primary planar waveguide 1 at each point of intersection with the DOE 4, and a fraction of the light to continue on its original trajectory down the length of the distribution planar waveguide 3 via TIR. At each point of intersection with the DOE 4, additional light is diffracted toward the entrance of the primary waveguide 1. By dividing the incoming light into multiple outcoupled sets, the exit pupil of the light is expanded vertically by the DOE 4 in the distribution planar waveguide 3. This vertically expanded light coupled out of distribution planar waveguide 3 enters the edge of the primary planar waveguide 1.

Light entering primary waveguide 1 propagates horizontally (i.e., relative to view of FIG. 4) along the primary waveguide 1 via TIR. As the light intersects with DOE 2 at multiple points as it propagates horizontally along at least a portion of the length of the primary waveguide 1 via TIR. The DOE 2 may advantageously be designed or configured to have a phase profile that is a summation of a linear diffraction grating and a radially symmetric diffractive lens. The DOE 2 may advantageously have a low diffraction efficiency. At each point of intersection between the propagating light and the DOE 2, a fraction of the light is diffracted toward the adjacent face of the primary waveguide 1 allowing the light to escape the TIR, and emerge from the face of the primary waveguide 1. The radially symmetric lens aspect of the DOE 2 additionally steers the beam at an angle that matches the designed focus level. FIG. 4 illustrates four beams 18, 19, 20, 21 extending geometrically to a focus point 13, and each beam is advantageously imparted with a convex wavefront profile with a center of radius at focus point 13 to produce an image or virtual object at a given focal plane.

FIG. 5 shows the optical system 300 illustrating generation thereby of a multi-focal volumetric display, image or light field. As in FIG. 4, a first set of four beams 18, 19, 20, 21 extends geometrically to a focus point 13, and each beam 18, 19, 20, 21 is advantageously imparted with a convex wavefront profile with a center of radius at focus point 13 to produce another portion of the image or virtual object at a respective focal plane to be viewed by the eye 22. FIG. 5 further illustrates a second set of four beams 24, 25, 26, 27 extending geometrically to a focus point 23, and each beam 24, 25, 26, 27 is advantageously imparted with a convex wavefront profile with a center of radius at focus point 23 to produce another portion of the image or virtual object 22 at a respective focal plane.

FIG. 6 shows an optical system 600 according to one illustrated embodiment. The optical system 600 is similar in some respects to the optical systems 100 and 300. In the interest of conciseness, only some of the differences are discussed.

The optical system 600 includes a waveguide apparatus 102, which as described above may comprise one or more primary planar waveguides 1 and associated DOE(s) 2 (not illustrated in FIG. 6). In contrast to the optical system 300 of FIGS. 3 to 5, the optical system 600 employs a plurality of microdisplays or projectors 602a-602e (only five shown, collectively, 602) to provide respective image data to the primary planar waveguide(s) 1. The microdisplays or projectors 602 can be arrayed or arranged along a face or along an edge 122 of the primary planar waveguide 1. There may, for example, be a one to one (1:1) ratio or correlation between the number of planar waveguides 1 and the number of microdisplays or projectors 602. The microdisplays or projectors 602 may take any of a variety of forms capable of providing images to the primary planar waveguide 1. For example, the microdisplays or projectors 602 may take the form of light scanners or other display elements, for instance the cantilevered fiber 7 previously described or a LCOS mirror set. The optical system 600 may additionally or alternatively include a collimation element 6 that collimates light provided from microdisplay or projectors 602 prior to entering the primary planar waveguide(s) 1.

The optical system 600 can enable the use of a single primary planar waveguide 1, rather than using two or more primary planar waveguides 1 (e.g., arranged in a stacked configuration along the Z-axis of FIG. 6). The multiple microdisplays or projectors 602 can be disposed, for example, in a linear array along the edge 122 of a primary planar waveguide that is closest to a temple of a viewer's head. Each microdisplay or projector 602 injects modulated light encoding sub-image data into the primary planar waveguide 1 from a different respective position, thus generating different pathways of light. These different pathways can cause the light to be coupled out of the primary planar waveguide 1 by a multiplicity of DOEs 2 at different angles, focus levels, and/or yielding different fill patterns at the exit pupil. Different fill patterns at the exit pupil can be beneficially used to create a light field display. Each layer in the stack or in a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth.

BRIEF SUMMARY OF THE INVENTION

In each of the embodiments discussed above, a light source is provided for injecting image information into the waveguide and using the DOE to distribute the light to the wearer. As discussed below, in the subject invention, a similar combination including a planar waveguide and a diffractive optical element is used to capture light entering one of the planar faces of the waveguide and then measuring the captured light with a sensor. The collection waveguide can be used alone or in combination with an output waveguide.

In a preferred embodiment, the apparatus includes a waveguide having opposed planar input and output faces. A diffractive optical element (DOE) is formed across the waveguide. The DOE is configured to couple a portion of the light passing through the waveguide into the waveguide. The light coupled into the waveguide is directed via total internal reflection to an exit location on the waveguide. The apparatus further includes a light sensor having an input positioned adjacent the exit location of the waveguide to capture light exiting therefrom and generate output signals corresponding thereto. A processor determines the angle and position of the coupled light with respect to the input face of the waveguide based on the output signals. The apparatus may include a narrow band wavelength filter aligned with the waveguide.

The apparatus may further include a second waveguide having opposed planar input and output faces, where the second waveguide may be aligned with and parallel to the first waveguide. A DOE may be formed across the second waveguide. The DOE may be configured to control the level of reflectivity at locations across faces of the second waveguide. The apparatus may further include a light generator having an output positioned adjacent the second waveguide to inject light into the second waveguide. A processor may control the light being injected into the second waveguide to guide light entering the second waveguide via total internal reflection to exit the waveguide at particular locations across the output face of the second waveguide.

The apparatus may further include a third waveguide extending along an edge of the first waveguide. The third waveguide may capture light exiting the exit location of the first waveguide and delivering the light to the sensor.

DETAILED DESCRIPTION OF THE INVENTION

Figure 1:
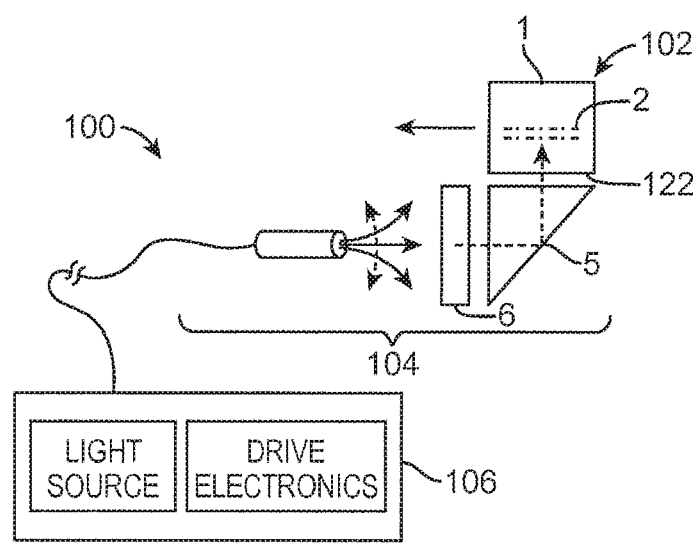
FIG. 1 is a schematic diagram showing an optical system including a waveguide apparatus, a subsystem to couple light to or from the waveguide apparatus, and a control subsystem, according to one illustrated embodiment.
Figure 2:
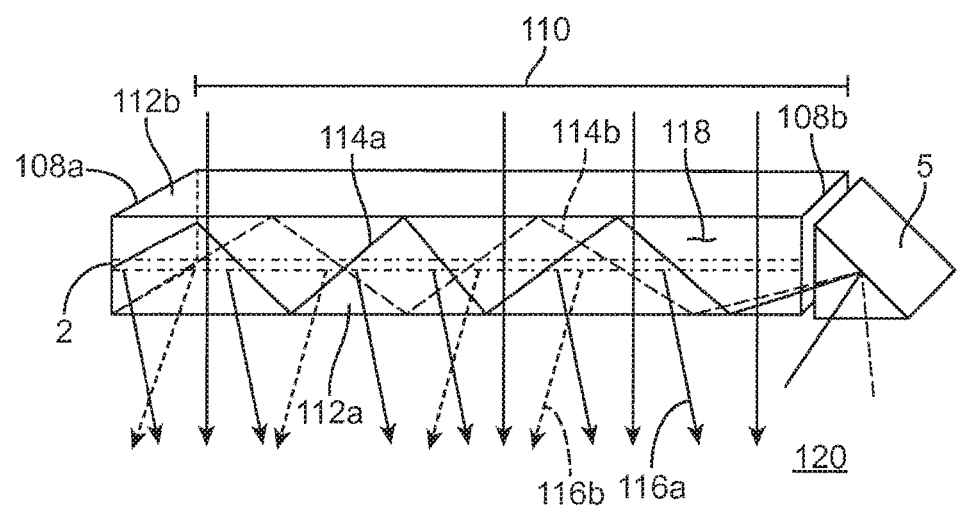
FIG. 2 is an elevational view showing a waveguide apparatus including a planar waveguide and at least one diffractive optical element positioned within the planar waveguide, illustrating a number of optical paths including totally internally reflective optical paths and optical paths between an exterior and an interior of the planar waveguide, according to one illustrated embodiment.
Figure 3:
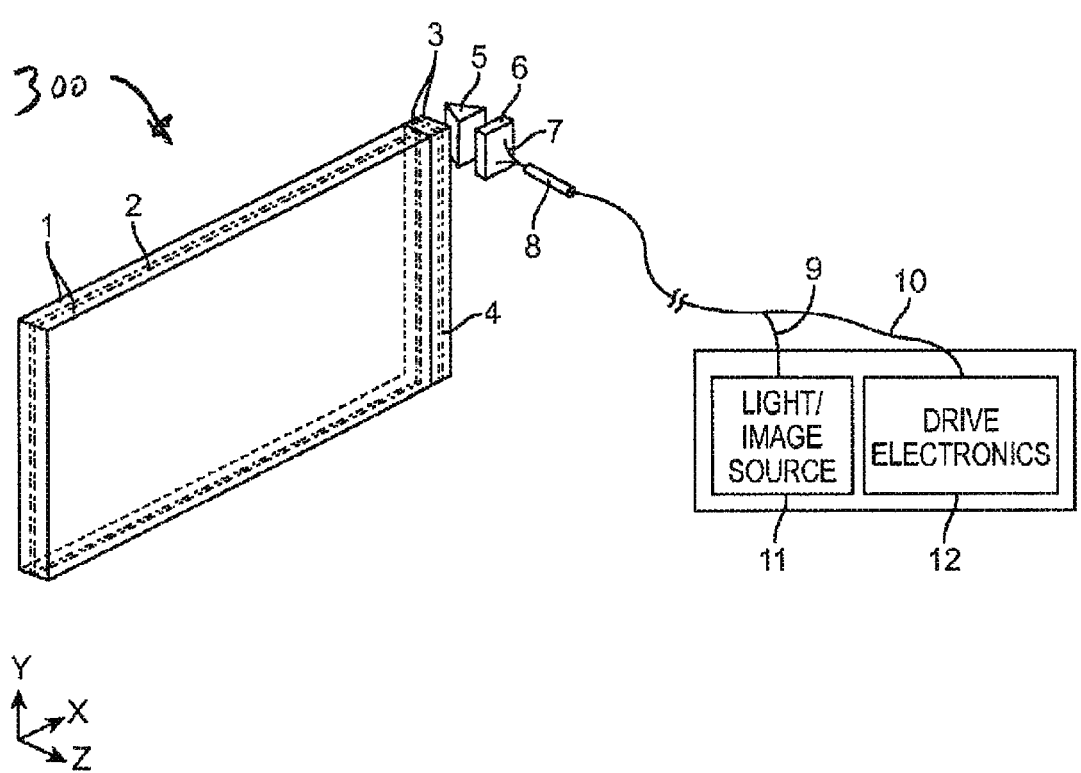
FIG. 3 is a schematic diagram showing an optical system including a waveguide apparatus, an optical coupler subsystem to optically couple light to or from the waveguide apparatus, and a control subsystem, according to one illustrated embodiment.
Figure 4:
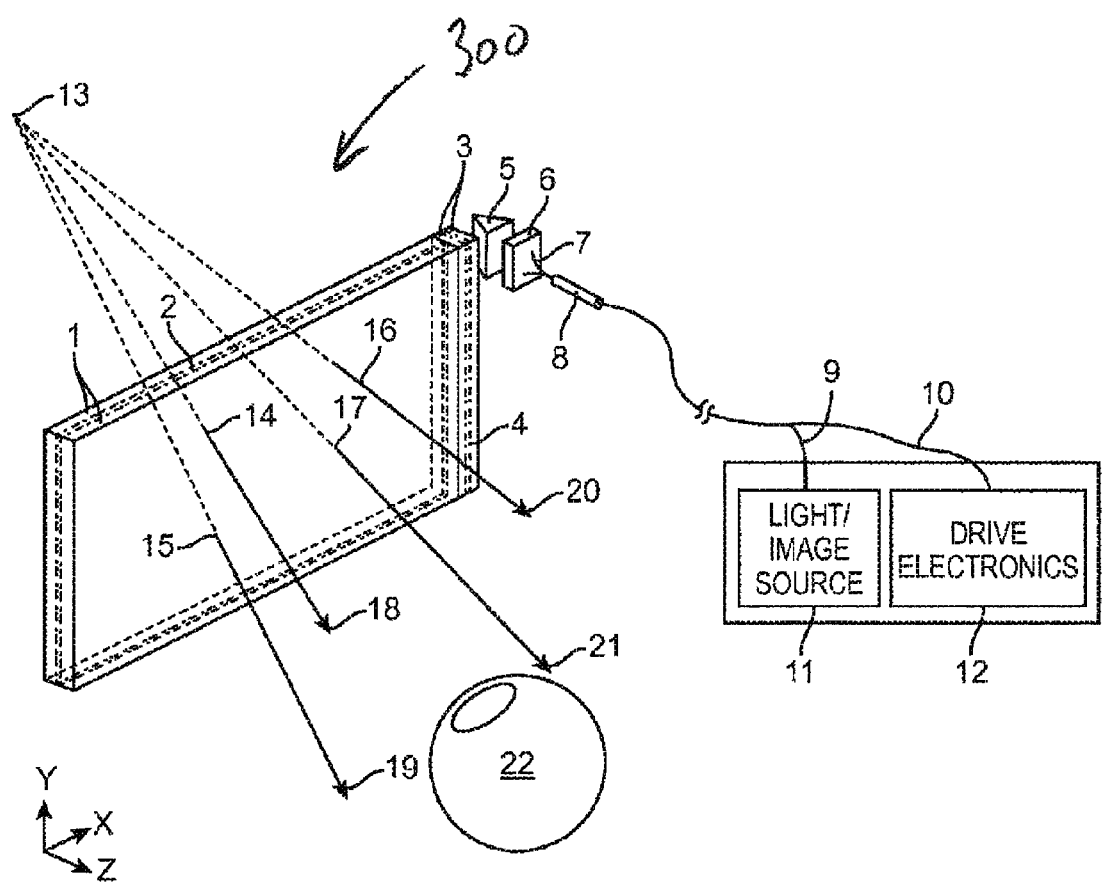
FIG. 4 is a schematic diagram of the optical system of FIG. 3 illustrating generation of a single focus plane that is capable of being positioned closer than optical infinity, according to one illustrated embodiment.
Figure 5:
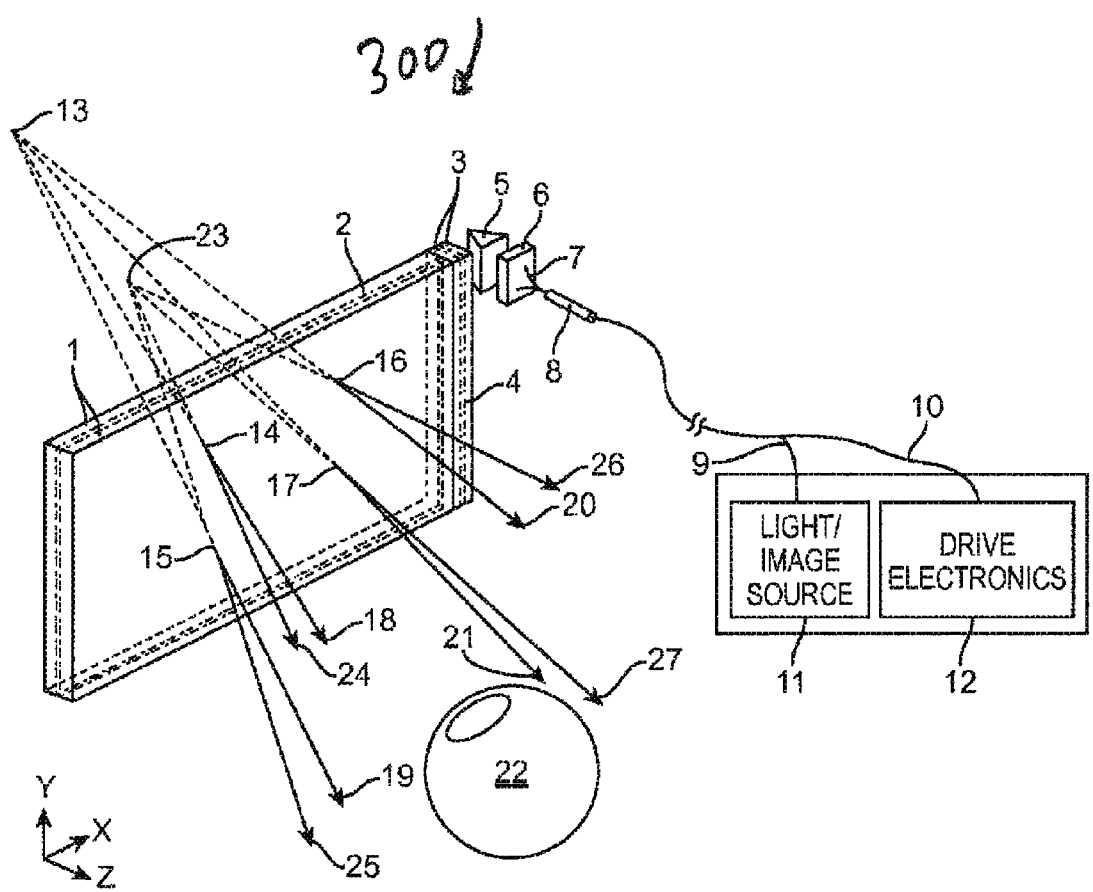
FIG. 5 is a schematic diagram of the optical system of FIG. 3 illustrating generation of a multi-focal volumetric display, image or light field, according to one illustrated embodiment.
Figure 6:
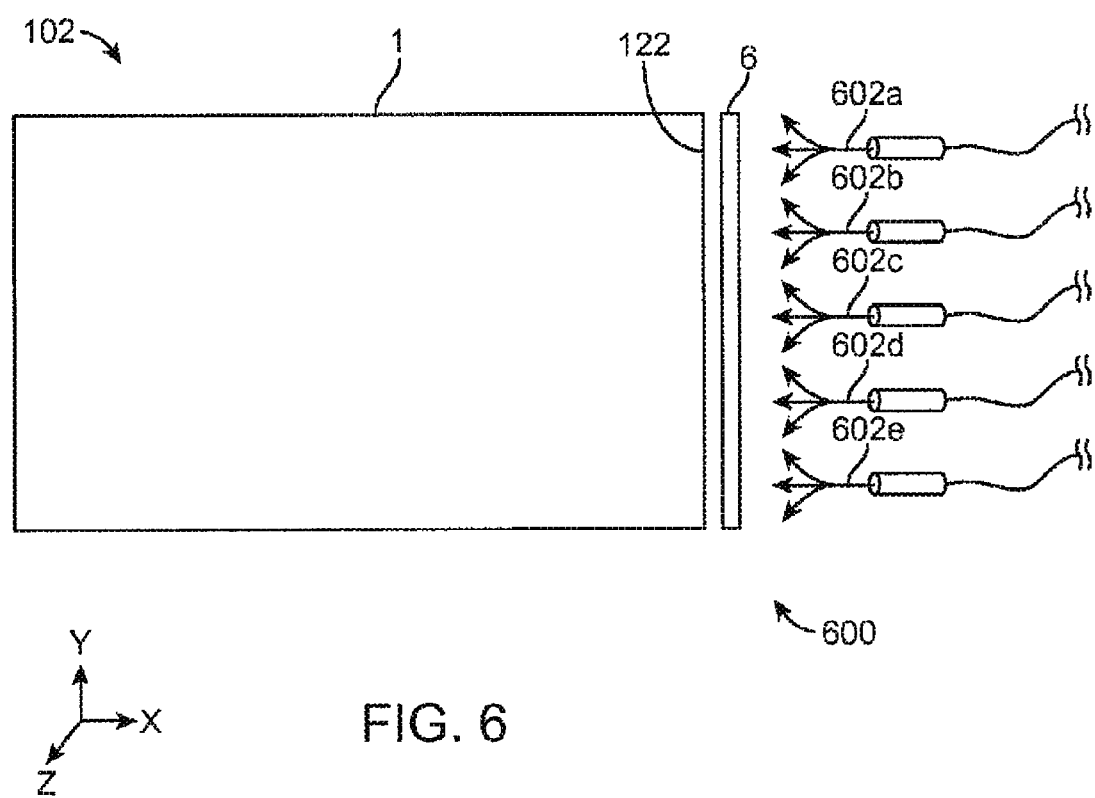
FIG. 6 is a schematic diagram showing an optical system including a waveguide apparatus, an optical coupler subsystem including a plurality of projectors to optically couple light to a primary planar waveguide, according to one illustrated embodiment.
Figure 7:
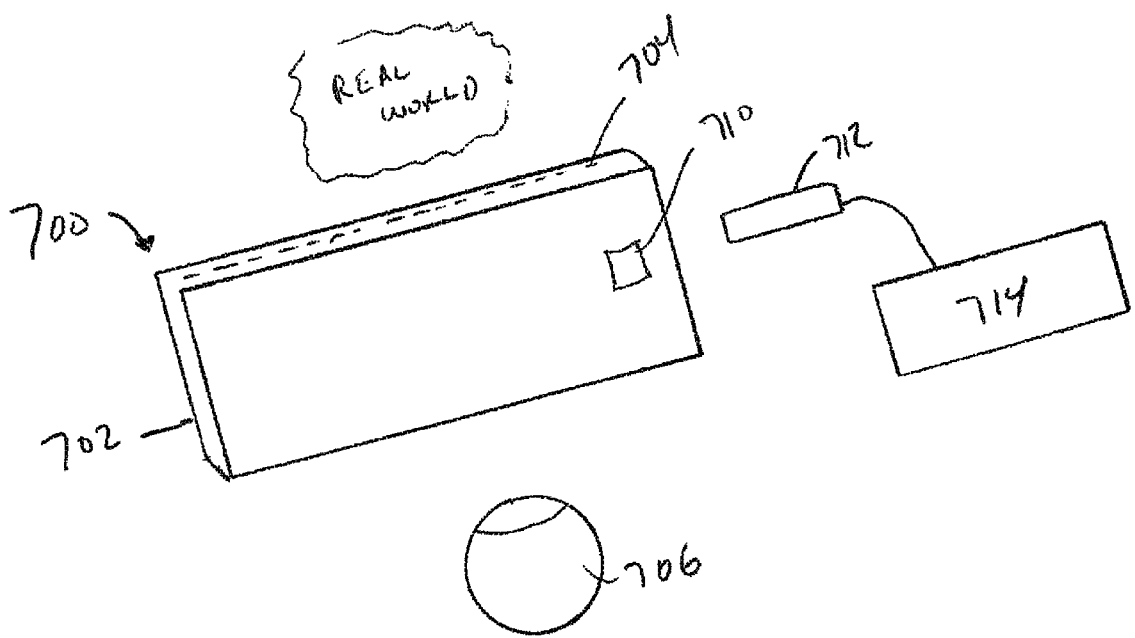
FIG. 7 is a schematic diagram showing an optical system with a planar waveguide and sensor in accordance with a basic embodiment of the subject invention.

FIG. 7 is a schematic diagram of a first embodiment of a system 700 of the subject invention. The system 700 includes a planar waveguide 702 having at least one diffractive optical element 704 formed therein. It is envisioned that the waveguide 702 could be constructed in a manner similar to any of the output type waveguides discussed above. In use, light rays from the real world will be partially transmitted through the waveguide to the eye 706 of the user.

In accordance with the subject invention, a portion of the rays entering waveguide 702 will be trapped by the waveguide and directed via total internal reflection along the length of the waveguide to an exit location shown at 710. The light exit location 710 can be on either the front or back of the waveguide or at a side edge thereof. Light exiting the waveguide can be captured by a sensor 712. Signals generated by the sensor are coupled to a processor 714 for analysis.

Various types of sensors could be used. For example, the sensor can include a movable fiber optic as discussed above with the output device. Similarly, an array of sensors could be provided. In addition, the sensor could include a LCOS system selectively directing light to additional, fixed position sensors such as CMOS or CCD imagers.

The processor 714 would analyze the input signals to determine the input position and angle of the rays that were captured by the waveguide and channeled to the exit location 710. In practice, this analysis could be complicated if only a single waveguide were used. For example, the single waveguide embodiment would produce signals that combine more than one wavelength of light reaching the waveguide.

Figure 8:
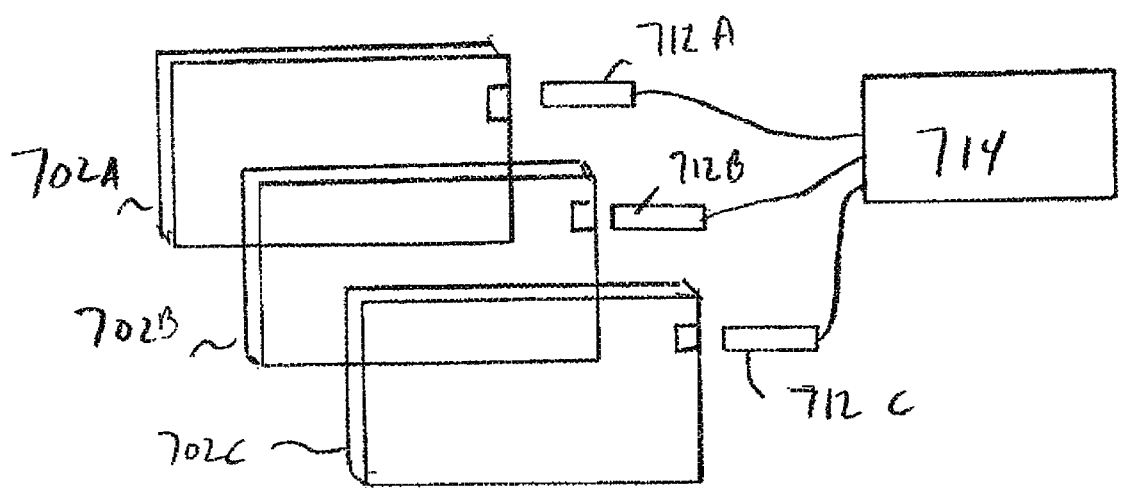
FIG. 8 is a schematic diagram of the system of the subject invention that includes three planar waveguides and associated color filters.

Accordingly, in one preferred embodiment, three similar waveguides would be used, each waveguide arranged to capture either red, blue or green light. FIG. 8 illustrates one example of such an arrangement. In FIG. 8, three aligned waveguides are provided, 702a, 702b and 702c. Diffractive filters 716 are provided in front of each waveguide to control the light entering the waveguides. The order of the filters could be selected to optimize the distribution of the light into the waveguides. For example, filter 716a could diffract a portion of the red light into waveguide 702a but allow the blue and green light to pass through the waveguide 702a. Filter 716b could diffract a portion of the green light into waveguide 702b. Filter 716c could diffract a portion of the blue light into waveguide 702c. Separate sensors 712a, 712b and 712c would collect light from waveguides 702a, 702b and 702c, respectively. The signals generated by the sensors would be analyzed by the processor.

It should be noted that the light rays which enter from any particular point on the waveguide will effectively be summed with light of the same color which enters at certain other points but on the same TIR path back to the sensor. In effect, one would get a superposition of light from many sources. The processor would need to be arranged to unravel this superposition of information via digital analysis. In practice, the algorithms could include various statistical analyses in conjunction with a learning system. The specific data analysis approach is not the subject of this application.

It should be noted that if the device is capturing an image of a flat object (e.g. a photograph), the deconvolution problem is much simpler. For a flat object, the deconvolution will have N displaced images, where N is the number of entry pupils on the edge element.

One way of addressing the deconvolution problem when imaging a three dimensional scene would be to utilize a plurality of DOEs across the waveguide that are actively switchable. Using electronic controls to vary the diffractive power of the DOEs, one could selectively allow individual entry pupils to be selectively turned on or shut off. Under this system, the processor would know in advance the entry location of light channeled by the waveguide and measured by the sensor.

It should be noted that if an active DOE system were used to image a flat image, each pupil would capture the entire undistorted image of the object.

Figure 9:
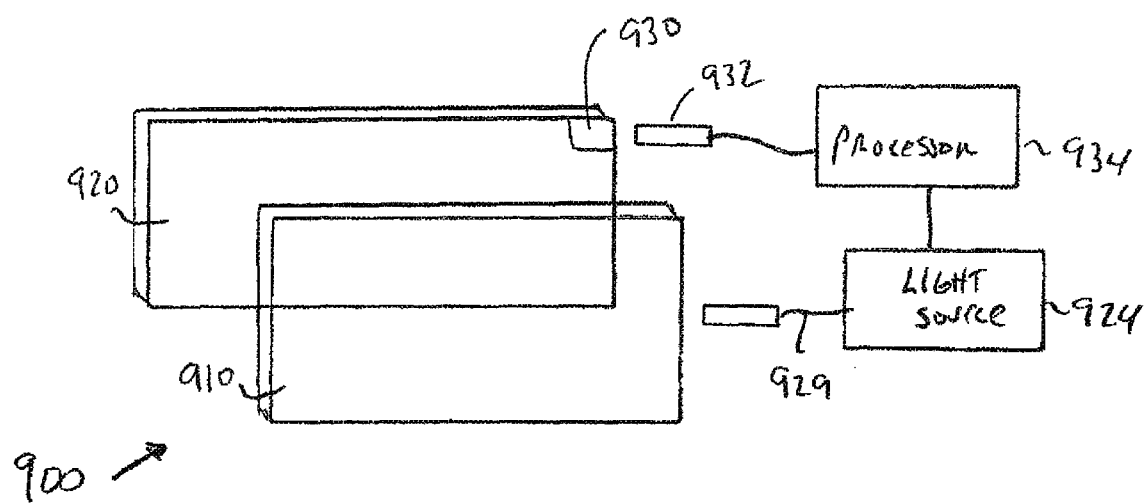
FIG. 9 is a schematic diagram of a preferred embodiment of the subject invention that includes two planar waveguides, one of the waveguides is used as in the prior art to deliver images to the eye and the other waveguide is used to capture images from the real world.

FIG. 9 is a diagram of an embodiment 900 that includes one output waveguide 910 and one collection waveguide 920. The output waveguide 910 would be of the type discussed above in the background of the specification and would include a light image source 924 and an optical fiber 929 for delivering the image information to the waveguide 910. The collection waveguide 920 would be similar to the embodiment of FIG. 7 wherein light captured by the waveguide 920 would be channeled by total internal reflection to an output location 930 and measured by sensor 932. The output from sensor 932 is supplied to processor 934. As discussed above, in a preferred embodiment, there would be three output waveguides and three input waveguides, each waveguide associated with a particular color spectrum (red, green, and blue). Only one of each type of waveguide is shown in FIG. 9 for convenience of illustration.

In the basic operation of the system 900, some of the light rays from the real world will pass through both waveguides 910 and 920 and into the eye of the user. Waveguide 910 can be used to deliver additional visual images to the eye to achieve an augmented reality. Waveguide 920 can be used to capture and measure light rays from the real world. This information can be used in a variety of ways.

For example, information captured from the real world can be used to modify the images generated for the output waveguide 910. In particular, the light output from waveguide 910 can be some specific function of the input measured at the same coordinate on the waveguide 920 surface. This function could include linear scaling, nonlinear scaling, and clipped scaling, as well as any other specific function of the intensity as computed on a per pixel basis or computed locally with respect to a pixel location.

The image information captured by waveguide 920 can also be used to help register virtual images generated by waveguide 910. In many currently envisioned augmented reality implementations, virtual objects are located in three dimensions and complex projections are made to compute their location on the waveguide 910. Information collected by waveguide 920 permits objects to be specifically registered with respect to the two dimensional image, thus guaranteeing their correct location relative to other landmarks in the image (i.e. no "jitter").

In another example, the image information collected by waveguide 920 can be used to recognize a specific image element in the real world and then compute a substitute element for presentation to the user via waveguide 910. For example, the system could recognize a person's face and then render a modified image (e.g., face with a beard) to the user. In another example, the color of a building could be changed. In still another example, signage in the real world written in one language could be rendered in a different language. This concept extends not only to "filters" which use image recognition or modeling, but also to simpler filters such as blur, or combinations of the above.

In an alternative embodiment, a controllable darkening layer (e.g., LCD, not shown) can be provided between the waveguides 910 and 920 for blocking the light from the real world from reaching the user's eye. Instead, this incoming light can be "substituted" with light generated by waveguide 910.

Algorithms for decoding the light captured by waveguide 920 and converted into a time sequential signal are context dependent.

For example, in a system wherein the sensor is a scanning fiber, the signals can be converted into a two dimensional rectilinear array of the kind expected by many image processing algorithms. In some cases, it may be easier to process the pixels in their natural polar form and output them in the same polar form.

In one implementation, there can be a direct assignment of the incoming polar coordinate pixel (IPCP) values to the rectangular coordinate pixels (RCP) found by direct computation. In another implementation, one can assign all rectangular coordinate pixels to the nearest rectangular coordinate pixel for which a corresponding incoming polar coordinate pixel can be found. In another approach, one can interpolate the assignment of rectangular coordinate pixels to the value of the nearest rectangular coordinate pixels for which a corresponding incoming polar coordinate pixel can be found. The latter approach includes linear, quadratic, or any other such interpolation. Finally, it is possible to pre-compute and store the relationship between the rectangular coordinate pixels and the associated incoming polar coordinate pixel projections.

While the subject invention has been described with reference to some preferred embodiments, various changes and modifications could be made therein, by one skilled in the art, without varying from the scope and spirit of the subject invention as defined by the appended claims.

What is claimed is:
1. An apparatus, comprising:
   a first waveguide having opposed planar input and output faces;
   a diffractive optical element (DOE) formed across the first waveguide, said DOE for coupling light into the waveguide and wherein the light coupled into the waveguide is directed via total internal reflection to an exit location on the waveguide; and
   a light sensor having an input positioned adjacent to the exit location of the first waveguide to capture light exiting therefrom and generating output signals corresponding thereto, wherein the angle and position of the light sensor with respect to the exit location of the first waveguide are movable and under the control of a processor.
2. An apparatus as recited in claim 1 further including a narrow band wavelength filter aligned with the first waveguide.
3. An apparatus as recited in claim 1 further comprising:
   a second waveguide having opposed planar input and output faces, said second waveguide being aligned with and parallel to the first waveguide;
   a DOE formed across the second waveguide, said DOE for controlling the level of reflectivity at locations across faces of the second waveguide; and
   a light generator having an output positioned adjacent to the second waveguide to inject light into the second waveguide and wherein a processor controls the light being injected into the second waveguide to guide light entering the second waveguide via total internal reflection to exit the waveguide at particular locations across the output face of the second waveguide.
4. An apparatus as recited in claim 1 further including a third waveguide extending along an edge of the first waveguide, said third waveguide for capturing light exiting the exit location of the first waveguide and delivering the light to the sensor.

* * * * *